United States Patent [19]
Krolak et al.

[11] 3,825,309
[45] July 23, 1974

[54] TRACK FRAME RECIPROCATING MECHANISM FOR TRACK-TYPE TRACTORS

[75] Inventors: Ronald L. Krolak, Metamora; Eldon D. Oestmann, Washington, both of Ill.

[73] Assignee: Caterpillar Tractor Co., Peoria, Ill.

[22] Filed: Aug. 22, 1972

[21] Appl. No.: 282,698

[52] U.S. Cl. .................................................. 305/31
[51] Int. Cl. ............................................. B62d 55/30
[58] Field of Search ............ 305/30, 31, 32, 10, 25, 305/29, 22

[56] References Cited
UNITED STATES PATENTS
| | | | |
|---|---|---|---|
| 1,849,560 | 3/1932 | White | 305/31 |
| 2,467,947 | 4/1949 | Skelton | 305/29 |
| 2,764,031 | 9/1956 | Nystrom | 305/31 X |

FOREIGN PATENTS OR APPLICATIONS
| | | | |
|---|---|---|---|
| 91,462 | 4/1958 | Norway | 305/31 |
| 764,868 | 1/1957 | Great Britain | 305/25 |

*Primary Examiner*—Richard Johnson
*Attorney, Agent, or Firm*—Phillips, Moore, Weissenberger, Lempio & Strabala

[57] ABSTRACT

A vehicle has on either side thereof a drive sprocket and front and rear ground idlers, and a track trained over and engaged by the drive sprocket and idlers. A frame is associated with the vehicle and has a forward portion on which the front idler is mounted, and a separate rearward portion on which the rear idler is mounted. The front and rear frame portions are associated by means of a pair of tubes extending from each, one inside the other, in sliding relation. Splined means are associated with the tubes to keep the front and rear idlers aligned relative to each other, and resilient means are associated with the tubes to allow recoil of the front idlers, meanwhile urging the front idler forwardly into a biased condition.

3 Claims, 3 Drawing Figures

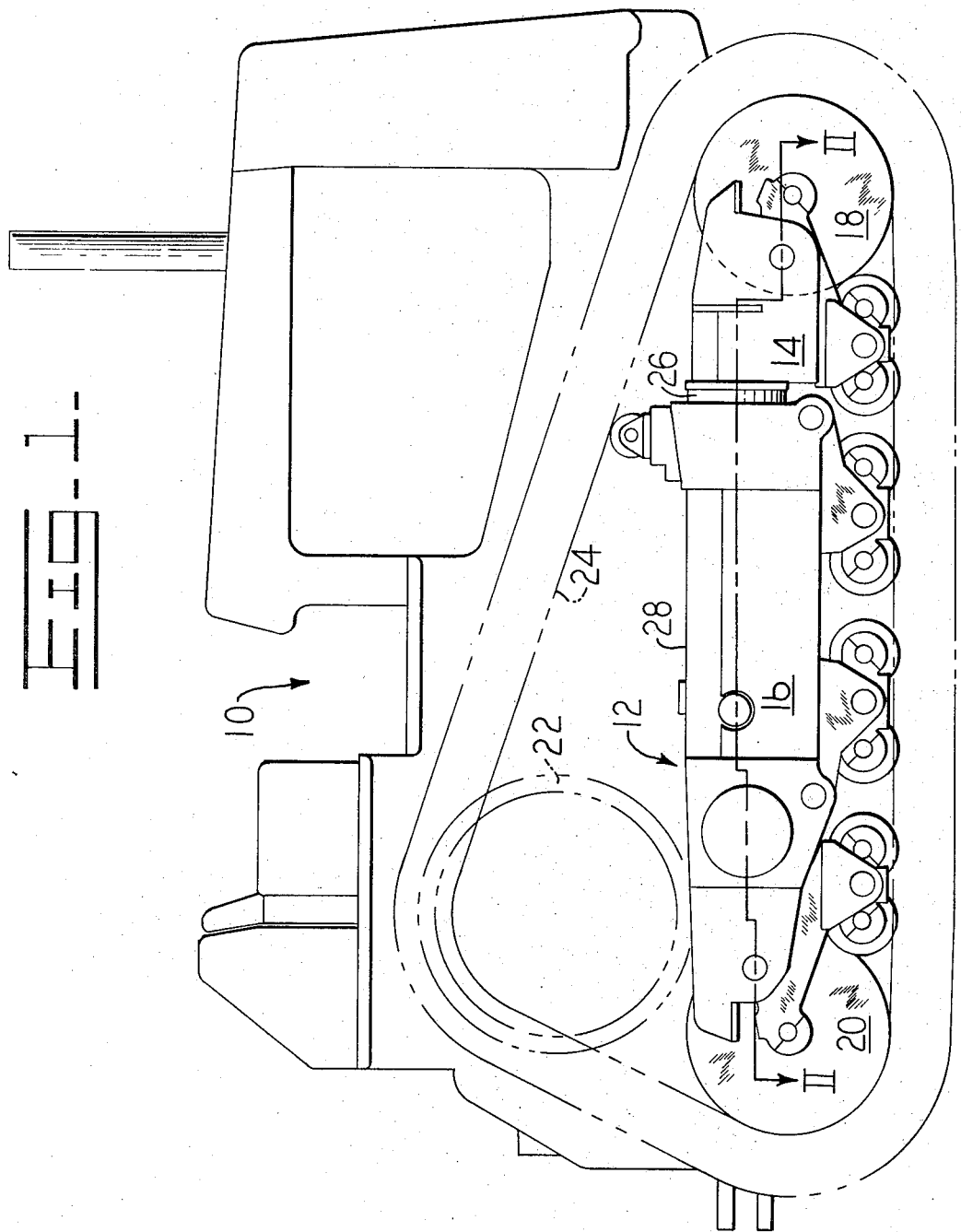

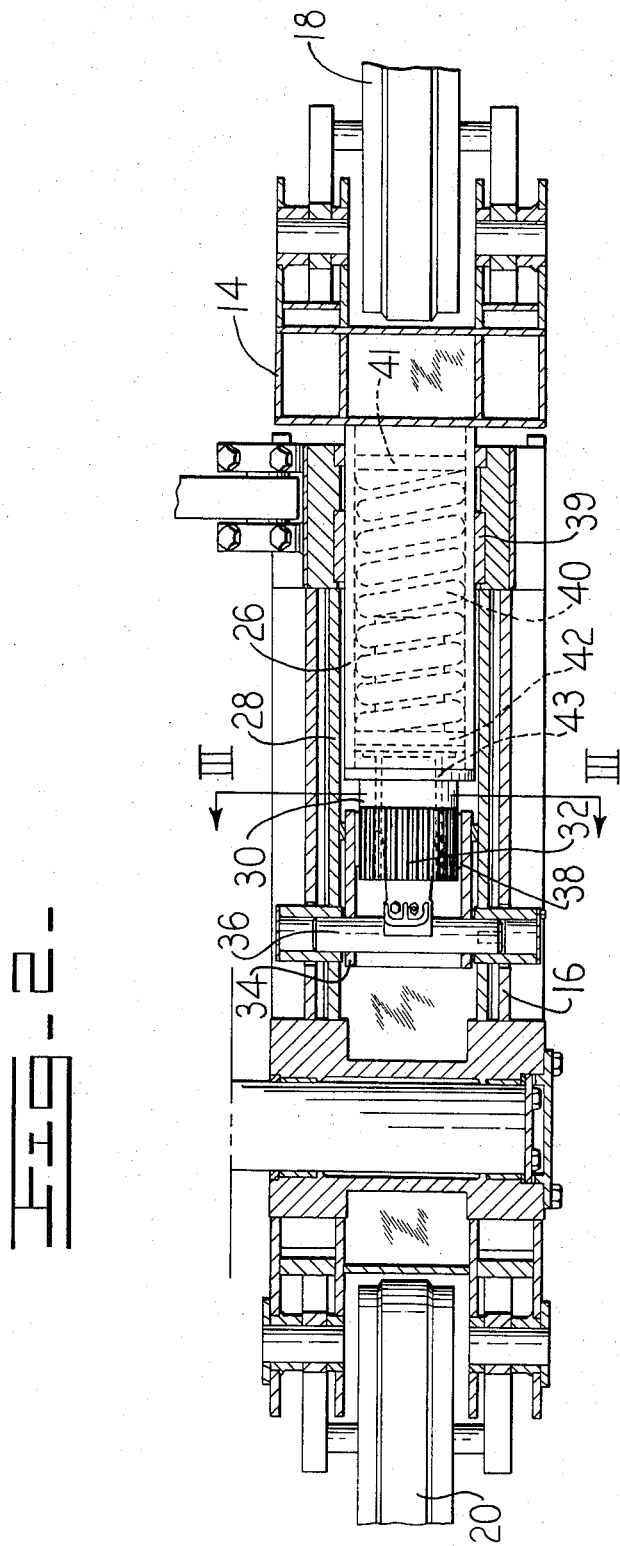

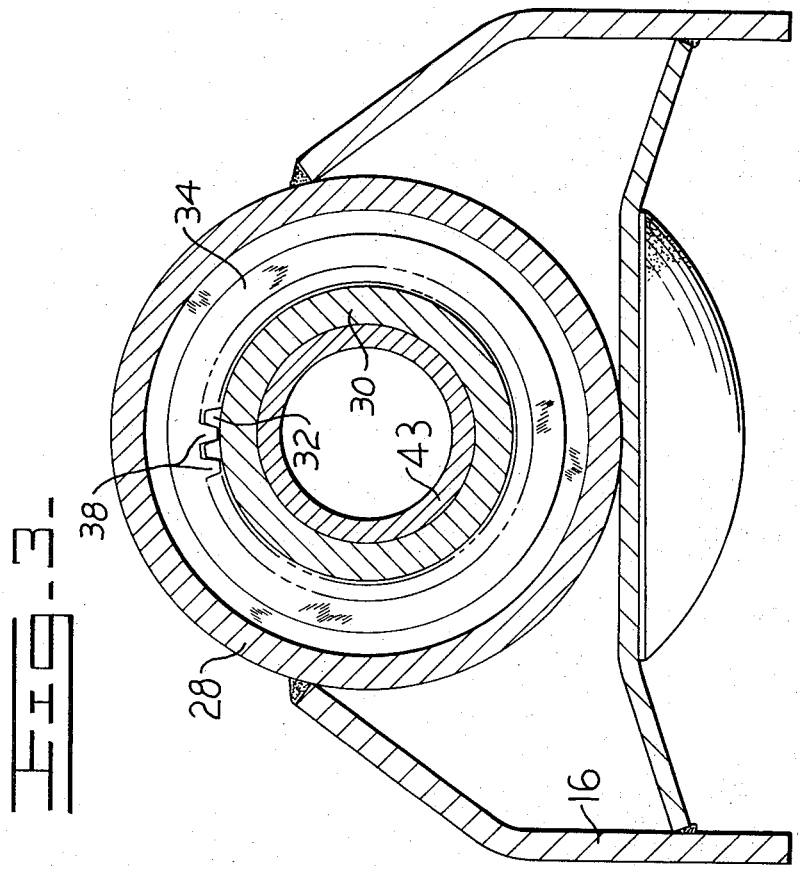

3,825,309

TRACK FRAME RECIPROCATING MECHANISM FOR TRACK-TYPE TRACTORS

BACKGROUND OF THE INVENTION

This invention relates to a system in a tractor for allowing recoil of tractor idlers, and more particularly to such a system which incorporates sliding tubes for allowing such recoil.

In a tractor of the endless track-type, it is customary that the track be trained over a rotatable member usually disposed to the rear, an idler forwardly disposed, and a number of supporting track rollers between the sprocket and idler, all rotatably fixed to a frame. The idler is also generally adapted for longitudinal sliding movement relative to the frame and is resiliently urged away from the rotatable member to maintain the track under tension, as well as to permit the idler to move toward the rotatable member in the event that foreign material becomes lodged in the inside of the track. Examples of such a system are — U.S. Pat. No. 3,409,335 to Piepho et al., U.S. Pat. No. 3,595,333 to Barbee, and U.S. Pat. No. 2,717,813 to Gardner, all assigned to the assignee of this application.

A problem encountered with the use of track-type tractors is one of continuously maintaining a predetermined tension on the endless tracks thereof, meanwhile allowing proper recoil of idlers thereof when necessary, and insuring proper alignment between the front and rear rotatable members involved. In such system, generally the front idlers are mounted in such a way, as by slide means, as in the above three patents, to allow the movement thereof toward the rear rotatable members under recoil. While such slide means have been found to be relatively efficient in use, it will be understood that an increase in efficiency and smoothness of operation, along with a high degree of simplicity, is always desirable.

SUMMARY OF THE INVENTION

It is therefore an object of this invention to provide, in a track-type tractor, means for allowing the recoiling of the front idlers thereof in a smooth and stable manner.

It is a further object of this invention to provide in a track-type tractor, means which provide proper tension on the tracks.

It is a still further object of this invention to provide, in a track-type tractor, a system wherein proper alignment between front and rear rotatable members is insured.

It is a still further object of this invention to provide, in a track-type tractor, means which, while fulfilling the above objects, are simple in design.

Broadly stated, the invention is in a vehicle having a track, and comprises a frame associated with the vehicle and comprising first and second separate end portions. An idler is mounted to the first end portion within and engaging said track. A rotatable member is mounted to the second end portion and engages said track. A first elongated member is fixed to the first end portion and extends toward the second end portion, and a second elongated member is fixed to the second end portion and extends toward the first end portion, the first elongated member being associated with the second elongated member to be reciprocable therealong and relative thereto, to allow movement of the first end portion and idler toward and away from said second end portion and rotatable member. Means are included for limiting rotative movement of the first elongated member about the longitudinal axis thereof relative to the second elongated member, meanwhile allowing such reciprocal movement. Resilient means are included for allowing movement of the first end portion toward the second end portion against the resiliency thereof, meanwhile urging the first end portion away from the second end portion, urging the idler into a preload condition.

BRIEF DESCRIPTION OF THE DRAWINGS

These and other objects of the invention will become apparent from a study of the following specification and drawings, in which:

FIG. 1 is a side elevation of a track-type tractor incorporating the invention;

FIG. 2 is a sectional view taken along the line II—II of FIG. 1; and

FIG. 3 is a sectional view taken along the line III—III of FIG. 2.

DESCRIPTION OF THE PREFERRED EMBODIMENT

Shown generally in FIG. 1 is a vehicle 10 incorporating the invention. Such vehicle 10 includes a frame 12 associated therewith. The frame 12 comprises a first end or forward portion 14, and a separate second end or rearward portion 16. An idler 18 is mounted on forward portion 14, and a rotatable member, in this embodiment another idler 20, is mounted on rearward portion 16. A drive sprocket 22 is associated with the vehicle 10, and a track 24 is trained over and engaged by drive sprocket 22 and idlers 18, 20, the idlers 18, 20 being within the track 24.

An elongated member 26, comprising a tubular member of substantially circular cross-section, is fixed to forward portion 14 and extends toward rearward portion 16. An elongated member 28, also comprising a tubular member of substantially circular cross-section, is fixed to the rearward portion 16 and extends toward the forward portion 14, with the tubular member 26 disposed slidably within the tubular member 28, with the longitudinal axes thereof substantially aligned.

A sleeve member 30 is fixed to the tubular member 26 and defines external splines 32 which run parallel to the longitudinal axis of the tubular member 26. A sleeve member 34 is fixed to the tubular member 28 by means of pin 36 and surrounds the sleeve member 30 and defines internal splines 38 running parallel to the longitudinal axis of the tubular member 28 which engage the splines 32 in sliding relation therewith.

It will be seen that, by this structure, the tubular member 26 is reciprocable along and within the tubular member 28, to allow movement of the forward portion 14 and idler 18 therewith toward and away from the rearward portion 16 and idler 20. However, it is to be noted that splines 32, 38, being engaged while allowing such reciprocal movement, limit rotative movement of the tubular member 26 relative to tubular member 28. Through such means, proper alignment between forward portion 14 and rearward portion 16, and thus between idler 18 and idler 20, is maintained.

A bearing 39 is fixed inwardly of tubular member 28 adjacent the forward end at tubular member 28. The tubular member 26 is thus supported at bearing 39 and the splines 32, 38, so that the forward portion 14 is stably held as it reciprocates.

Resilient means 40 comprising a spring is interposed between a wall 41 fixed within tubular member 26 and a wall 42 fixed in the end of a shaft 43 slidably disposed through a bore in sleeve member 30 and fixed relative to sleeve member 34. Such spring 40 and the associated structure described, it will be seen, allow movement of the forward portion 14 toward the rearward portion 16 against the resiliency thereof, with tubular member 26 sliding within and along tubular member 28 during such movement. The spring 40 urges the forward portion 14 away from the rearward portion 16, in turn urging the idler 18 away from the idler 20 into a preloaded condition.

In such manner, track 24 is kept properly preloaded, but recoil of idler 18 is allowed through the structure described. Moreover, the sliding tube and spline combination insures proper recoiling of the front idler when necessary, such rearward movement of the idler 18 taking place in a relatively free manner. However, the splines 32, 38 involved insure that proper alignment of the idlers 18, 20 is maintained.

What is claimed is:

1. In a vehicle having a track, a frame associated with the vehicle and comprising first and second separate end portions; an idler mounted to the first end portion within and engaging said track; a rotatable member mounted to the second end portion within and engaging said track; a first elongated member fixed to the first end portion and extending toward the second end portion; a second elongated member fixed to the second end portion and extending toward the first end portion, the first elongated member being associated with the second elongated member to be reciprocable therealong and relative thereto, to allow movement of the first end portion and idler toward and away from said second end portion and rotatable member; means for limiting rotative movement of the first elongated member about the longitudinal axis thereof relative to the second elongated member, meanwhile allowing such reciprocal movement; resilient means for allowing movement of the first end portion against the resiliency thereof, meanwhile urging the first end portion away from the second end portion, urging the idler into a preloaded condition, and wherein the first and second elongated members comprise first and second tubular members of substantially circular cross-section, with one tubular member disposed slidably within the other tubular member, with the longitudinal axes thereof substantially aligned, and wherein the means for limiting rotative movement of the first elongated member about the longitudinal axis thereof relative to the second elongated member, meanwhile allowing such reciprocal movement, comprise spline means associated with the first and second tubular members.

2. The vehicle of claim 1 wherein the first end portion comprises the forward portion of the frame, and the second end portion comprises the rearward portion of the frame.

3. In a vehicle having a frame having separate forward and rearward portions, having a frame having separate forward and rearward portions, first and second idlers mounted to the forward and rearward portions respectively, and a track trained over and engaged by the idlers, a first elongated member fixed to the forward portion and extending toward the rearward portion; a second elongated member fixed to the rearward portion and extending toward the forward portion, the first elongated member being associated with the second elongated member to be reciprocable therealong and relative thereto, to allow movement of the forward portion and first idler toward and away from the rearward end portion and second idler, means for limiting rotative movement of the first elongated member about the longitudinal axis thereof relative to the second elongated member, meanwhile allowing such reciprocal movement; resilient means for allowing movement of the forward portion toward the rearward portion against the resiliency thereof, meanwhile urging the forward portion away from the rearward portion, urging the first idler away from the second idler into a preloaded condition, and wherein the first and second elongated members comprise first and second tubular members of substantially circular cross-section, with one tubular member disposed slidably within the other tubular member, with the longitudinal axes thereof substantially aligned, and wherein the first tubular member is disposed within the second tubular member, and wherein the means for limiting rotative movement of the first elongated member about the longitudinal axis thereof relative to the second elongated member, meanwhile allowing such reciprocal movement, comprise a first sleeve member fixed to the first tubular member and defining internal splines running parallel to the longitudinal axis of the first tubular member, and a second sleeve member fixed to the second tubular member and surrounding the first tubular member and defining internal splines running parallel to the longitudinal axis of the second tubular member and engaging the splines defined by the first sleeve member.

* * * * *

Disclaimer

3,825,309.—*Ronald L. Krolak,* Metamora and *Eldon D. Oestmann,* Washington, Ill. TRACK FRAME RECIPROCATING MECHANISM FOR TRACK-TYPE TRACTORS. Patent dated July 23, 1974. Disclaimer filed Sept. 28, 1981, by the assignee, *Caterpillar Tractor Co.*

Hereby enters this disclaimer to claims 1 and 2 of said patent.

[*Official Gazette December 15, 1981.*]